(12) United States Patent
Engelmann et al.

(10) Patent No.: US 7,658,692 B2
(45) Date of Patent: Feb. 9, 2010

(54) DOUBLE DIFFERENTIAL ASSEMBLY FOR A MOTOR VEHICLE DRIVEN BY A PLURALITY OF AXLES

(75) Inventors: Michael Engelmann, Berlin (DE); Mark Schmidt, Königswinter (DE); Heinzwilli Fuchs, Mühleip (DE)

(73) Assignee: GKN Driveline International GmbH, Lohmar (DE)

( * ) Notice: Subject to any disclaimer, the term of this patent is extended or adjusted under 35 U.S.C. 154(b) by 383 days.

(21) Appl. No.: 11/689,732

(22) Filed: Mar. 22, 2007

(65) Prior Publication Data
US 2007/0238570 A1 Oct. 11, 2007

(30) Foreign Application Priority Data
Mar. 22, 2006 (DE) ........................ 10 2006 013 577

(51) Int. Cl.
*F16H 48/06* (2006.01)
(52) U.S. Cl. ....................................... 475/221; 475/230
(58) Field of Classification Search ................. 475/220, 475/221, 230, 903
See application file for complete search history.

(56) References Cited
U.S. PATENT DOCUMENTS 4,815,336 A * 3/1989 Katayama et al. ............. 475/85
5,472,385 A 12/1995 Vu
2007/0093349 A1 * 4/2007 Tanaka et al. ............... 475/231

FOREIGN PATENT DOCUMENTS

| DE | 33 11 175 A1 | 10/1984 |
| EP | 0 043 806 A1 | 1/1982 |
| EP | 1 239 188 A1 | 11/2002 |

* cited by examiner

*Primary Examiner*—David D Le
*Assistant Examiner*—Erin D Bishop
(74) *Attorney, Agent, or Firm*—Rader, Fishman & Grauer, PLLC (57) ABSTRACT

A double differential assembly having a first differential drive (3) with a differential carrier (5) drivable around an axis of rotation (A), a plurality of first differential gears (6) rotatably supported therein, as well as two output gears (7, 8) which are coaxially arranged relative to the axis of rotation (A) and engage the first differential gears (6). It also includes a second differential drive (4) with a cage element (22) which is firmly connected to one of the output gears (8) of the first differential drive (3) and is drivable thereby around the axis of rotation (A), a plurality of second differential gears (25) which are rotatably held in the cage element (22), and two sideshaft gears (26, 27) which are arranged coaxially relative to the axis of rotation (A) and engage the second differential gears (25). At least one of the two differential drives (3, 4) is a crown gear differential.

17 Claims, 6 Drawing Sheets

DOUBLE DIFFERENTIAL ASSEMBLY FOR A MOTOR VEHICLE DRIVEN BY A PLURALITY OF AXLES

TECHNICAL FIELD

The invention relates to a double differential assembly for use in the driveline of a motor vehicle driven by a plurality of axles.

BACKGROUND OF THE INVENTION

Motor vehicles driven by a plurality of axles can be divided into those with a hang-on four-wheel drive wherein a primary axle is driven permanently and a secondary axle is connected if required, and those with permanent four-wheel drive wherein both axles are driven permanently. The design of the driveline is largely influenced by the arrangement of the engine in the motor vehicle, i.e. whether it is arranged in the front or at the rear, and whether it is positioned in the longitudinal or transverse direction. At the same time, the automotive industry desires continuous improvements such as lightweight and compact solutions for differentials.

There already exist prior art combined differential assemblies which permit differential movements between the two sideshafts of one of the two driven axles on the one hand, and between the two driven axles relative to one other on the other hand.

EP 043 806 B1 or EP 1 239 188 B1 propose combined differential assemblies which each comprise a first engine-driven differential for distributing the torque to the front axle and to the rear axle, and a second differential connected in series thereto for distributing torque to the two sideshafts of the front axle. The first differential is provided in the form of a planetary differential whose web is firmly connected to the carrier of the second differential.

From DE 33 11 175 A1, there is known a similar differential assembly wherein the first differential is provided in the form of a planetary differential or bevel gear differential.

SUMMARY OF THE INVENTION

The present invention provides a combined differential assembly for use in the driveline of a motor vehicle which is driven by a plurality of axles and which is compact in design and easy and inexpensive to produce.

In accordance with an embodiment of the invention, a double differential assembly, more particularly for use in the driveline of a motor vehicle driven by a plurality of axles is provided. It includes a first differential drive having a differential carrier which is rotatingly drivable around an axis of rotation A, and a plurality of first differential gears which are rotatably held in the differential carrier on first axes B extending at an angle relative to the axis of rotation A and which rotate jointly with the differential carrier around the axis of rotation A. The first differential drive further includes a first output gear and a second output gear which are arranged coaxially relative to the axis of rotation A and engage the first differential gears. The double differential assembly further includes a second differential drive having a cage element which is firmly connected to the second output gear of the first differential drive and which is rotatingly drivable by same around the axis of rotation A, and a plurality of second differential gears 25 which are rotatably held in the cage element 22 on second axes C extending perpendicularly relative to the axis of rotation A and which rotate jointly with the cage element 22 around the axis of rotation A. The second differential drive further has a first sideshaft gear and a second sideshaft gear which are arranged coaxially relative to the axis of rotation A and engage the second differential gears.

The inventive double differential assembly is advantageous in that it provides a compact design because at least one of the two differential drives, i.e. the first or the second differential drive is provided in the form of a crown gear differential. A crown gear differential in this context is meant to be a differential drive wherein the differential gears are provided in the form of cylindrical spur gears with spur teeth which engage output gears in the form of crown gears with crown teeth. A particularly compact design is achieved if the cage element is arranged in the differential carrier and is rotatably supported relative thereto. As a result, the differential gear set of the first differential drive and the differential gear set of the second differential drive are jointly received in the differential carrier. For supporting the cage element in the differential carrier, a friction bearing can be provided. A further advantage is that by selecting suitable angles between the axes B and the axis of rotation A, it is possible to define the division of the torque between the two output gears, i.e. between the front axle and rear axle in accordance with requirements of the particular application under consideration.

According to a first embodiment, the first differential drive is provided in the form of a crown gear differential, wherein the output gears are provided in the form of crown gears and the first differential gears in the form of cylindrical spur gears, with the center lines of the tooth flanks of the output gears extending parallel to the axis B of the first differential gears. Alternatively or in addition thereto, the second differential drive can also be provided in the form of a crown gear differential, wherein the sideshaft gears are provided in the form of crown gears and the second differential gears in the form of cylindrical spur gears, with the center lines of the tooth flanks of the crown gears being positioned in a plane which is the normal plane relative to the axis of rotation A. By designing the two differential drives as crown gear differentials, it is possible to achieve a particularly compact shape because the crown gears comprise a short axial length. A particularly advantageous embodiment in the sense of a compact design with identical components is obtained when the differential gears of the first differential drive and the differential gears of the second differential drive are identical, which results in a reduction in production costs.

According to one embodiment, the angles which are enclosed between the axes B and the axis of rotation A range between 10° and 90°, so that a higher percentage of torque is transmitted to the first transverse axle than to the second transverse axle. For example, the first transverse axis can be the front axle and the second transverse axis can be the rear axle of the motor vehicle. However, a reverse arrangement is also possible, for example, for a vehicle wherein the engine is arranged at the rear. To achieve an unequal distribution of torque between the axles, the two output gears can comprise different diameters, with the teeth of the first output gear being positioned on a smaller radius relative to the axis of rotation A than the teeth of the second output gear. It is particularly advantageous if 60% of the torque introduced into the differential carrier is transmitted to the cage element and thus on to front axle, whereas the remaining 40% is allocated to the first output gear and thus to the rear axle being drivingly connected thereto. According to a further embodiment, the angles between the axes B and the axis of rotation A amount to exactly 90°, so that there is achieved a symmetric distribution of torque between the two output gears and thus between the front axle and the rear axle. In this embodiment, the two output gears are identical in shape. In a third embodiment, the angles between the axes B and the axis of rotation A can also be greater than 90°, so that a higher torque is transmitted to the first output gear and the rear axle respectively. The first output gear has a greater diameter than the second output gear.

According to another embodiment, the teeth of the second output gear, with reference to the axis of rotation A, are positioned radially outside the teeth of the first sideshaft gear. Furthermore, the teeth of the second output gear, with reference to the axis of rotation A, can partially overlap with those of the first sideshaft gear. These measures result in a particularly compact design of the double differential assembly.

According to a further advantageous embodiment, an inserted element with a central aperture is held in the differential carrier so as to extend coaxially relative to the axis of rotation. The inserted element is axially supported against the differential carrier on the one hand, and against the first sideshaft gear on the other hand. The inserted element is thus capable of accommodating axial expanding forces starting from the second differential drive and introduce same into the differential carrier. A sideshaft to be connected to the first sideshaft gear in a rotationally fast way passes through the central aperture. The phrase rotationally fast means that there is no relative rotation between the parts. For example, welded parts are connected in a rotationally fast way. The inserted element can comprise bores into which there are inserted inner ends of journals for supporting the first differential gears with the outer ends of the journals being received in radial apertures of the differential carrier. The journals are thus supported on their radial inside and outside, so that the differential gears are securely held in their position. The inserted element is rotationally fixed relative to the differential carrier, so that the inner ends of the journals, too, are circumferentially supported relative to the differential carrier.

According to another embodiment, the differential carrier comprises an inner cylindrical portion in which the cage element is slidingly supported by means of a cylindrical outer face. This characteristic, too, contributes towards a compact design. Furthermore, the cage element and the second output gear can be produced in one piece, which advantageously reduces the number of parts. The cage element can be annular in shape, with its first end face being axially supported against a radial face of the differential carrier and with the second output gear being formed on the opposed second end face. Between the first end face of the cage element and the radial face of the differential carrier, there is provided an axial needle bearing for rotational supporting purposes. The cage element comprises a casing portion with radial bores into which there are inserted journals for supporting the second differential gears. Because, in the radial direction, there exists at most a small annular gap between the cage element and the differential carrier, the journals do not require any further axial securing mechanism for supporting the differential gears; because the journals are able to axially support themselves directly on the inner wall of the differential carrier in respect of their journal axis.

For radially supporting the second differential gears in respect of the axis of rotation A, the crown gears of the second differential drive can comprise hubs which axially project beyond the tip lines of the crown teeth and against which the second differential gears are able to abut.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should be made to the embodiments illustrated in greater detail in the accompanying drawings and described below by way of examples of the invention.

DETAILED DESCRIPTION OF THE DRAWINGS

Figure 1:
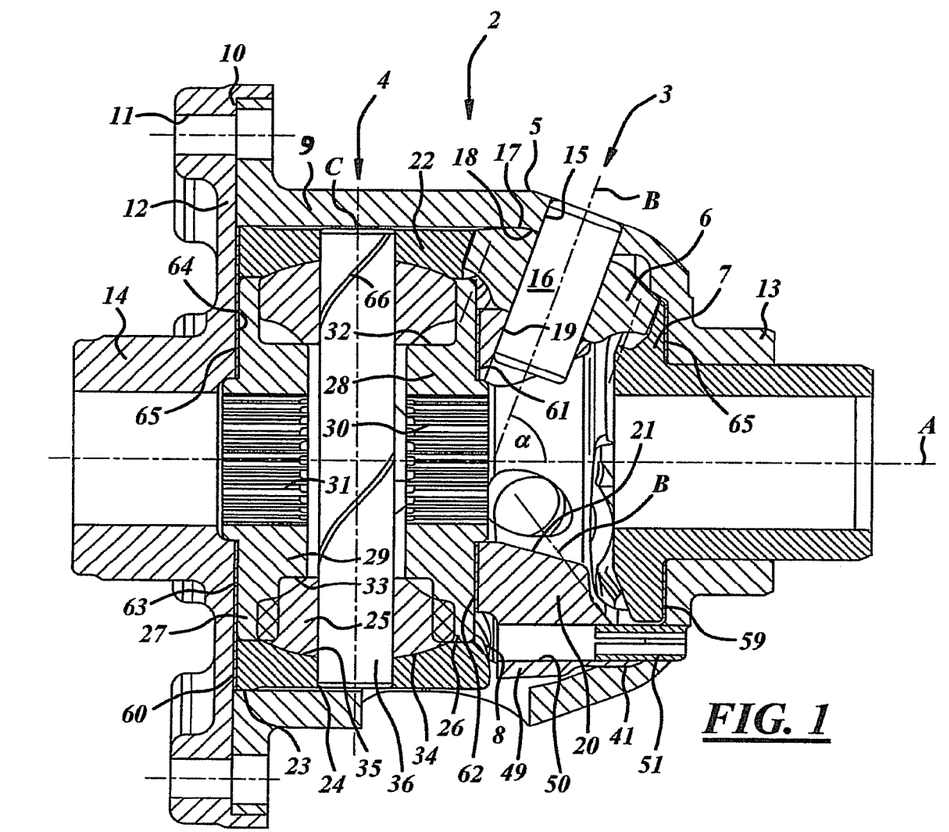
FIG. 1 shows a longitudinal section through a first embodiment of a double differential assembly.
Figure 2:
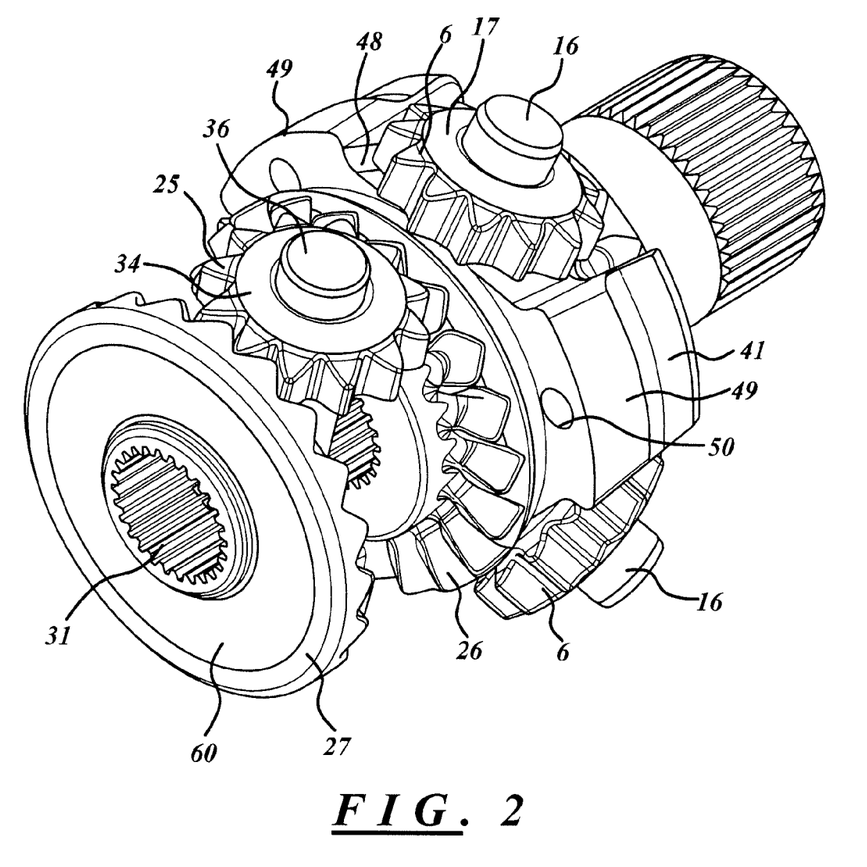
FIG. 2 is a perspective view of the differential gear set with the inserted element of the double differential assembly according to FIG. 1.

FIGS. 1 and 2 will be described jointly below. They show an inventive double differential assembly 2 for a motor vehicle driven by a plurality of axles. The double differential assembly 2 comprises a first differential drive 3 for dividing an introduced torque between the front axle and the rear axle of the motor vehicle, as well as a coaxially adjoining second differential drive 4 for dividing the torque transmitted to the front axle between two sideshafts.

The first differential drive 3 comprises a differential carrier 5 which is drivable around an axis of rotation A, a plurality of differential gears 6 which are rotatably supported in the differential carrier 5 on axes B extending at an angle relative to the axis of rotation A and which rotate jointly with the differential carrier 5 around the axis of rotation A, as well as a first and a second output gear 7, 8 whose teeth engage those of the differential gears 6. The output gears 7, 8 are rotatably supported in the differential carrier 5 so as to extend coaxially relative to the axis of rotation A and serve to drive the front axle and rear axle respectively of the motor vehicle. The first differential drive 3 is provided in the form of a crown gear differential, i.e. the differential gears 6 are provided in the form of cylindrical spur gears with spur teeth, and the output gears 7, 8 are provided in the form of crown gears with crown teeth. The lines of contact of the inter-engaging crown gears and spur gears extend parallel to the respective axis B of the spur gear.

The differential carrier 5 is produced in two parts and comprises a dish-shaped first carrier part 9 and a cover-shaped second carrier part 12 connected thereto via a flange connection 10. The flange connection 10 comprises a plurality of circumferentially distributed bores 11 for receiving bolts and which have to be tensioned. The differential carrier 5 comprises sleeve-shaped projections 13, 14 for receiving bearing means (not illustrated) which, at axially opposed ends, are formed on to the first and second carrier part 9, 12, the bearing means extending coaxially relative to the axis of rotation A. The bearing means serve to rotatably support the differential carrier 5 in a drive housing (not illustrated).

in the first carrier part 9, there are provided bores 15 which extend coaxially to the axes B and into each of which there is inserted a journal 16 with its radially outer end being received in the bore 15 of the carrier part 9. Between the axes B and the axis of rotation A there is enclosed an angle α which, in the present embodiment, ranges from about 10° to 90° and, as shown, is approximately 70°. This results in an asymmetric distribution of torque between the first crown gear 7 which serves to drive the rear axle and the second crown gear 8 which serves to drive the front axle. In the present embodiment, the crown teeth of the first crown gear 7 comprise a smaller diameter than the crown teeth of the second crown gear 8, so that a greater amount of torque is transmitted to the front axle. The distribution of torque can be defined by selecting the angle α and thus the diameter of the crown teeth of the crown gears 7, 8.

On each journal 16 there is rotatably supported an associated spur gear 6. The spur gears 6 each comprise a spherical outer face 17 by means of which they are radially supported against a matching inner face 18 of the first carrier part 9. By their radial inner ends, the journals 16 are inserted into bores 19 of the inserted element 20 which is particularly easy to see in FIG. 2. The axes B are defined by the bores 15 in the differential carrier 5 and by the bores 19 in the inserted element 20. It can be seen that there are provided three differential gears 6 which are each rotatably supported on an associated journal 16. The inserted element 20 thus also has three bores 15 into which the journals 16 are inserted.

The inserted element 20 is entirely annular and comprises a central aperture 21 through which there can pass a sideshaft (not illustrated). Furthermore, the inserted element 20, in the region of the bores 15, comprises circumferentially extending radial recesses 48 in which the differential gears 6 are accommodated. Between two adjacent radial recesses 48 there are provided projections 49 extending in circumferential direction which projections 49 hold the inserted element 20 in the differential carrier 5. In the projections 49, there can be seen axially extending bores 50 into which there are inserted pins 51 which prevent rotation relative to the differential carrier 5. Three pins 51 are shown which are distributed around the circumference and which engage corresponding bores in the differential carrier 5. The inserted element 20 and the differential carrier 5 are thus connected to one another in a rotationally fixed way. Furthermore, it can be seen that, at its projections 49, the inserted element 20 comprises cylindrical outer faces 41 by means of which it is centered on the axis of rotation A relative to an inner cylindrical face of the differential carrier 5.

The second differential drive 4 comprises a cage element 22 which is produced so as to form one piece with the second crown gear 8 of the first differential drive 3 and which serves as the differential carrier for the second differential drive 4. The cage element 22 is annular in shape and comprises a cylindrical outer face 23 by means of which it is guided and slidingly supported relative to a cylindrical inner face 24 of the differential carrier 5. The cage element 22 can be axially supported relative to the differential carrier 5 by a needle bearing.

The second differential drive 4, in addition to the cage element 22, comprises a plurality of differential gears 25 which rotate jointly with the cage element 22 around the axis of rotation A, as well as a first and a second sideshaft gear 26, 27. The two sideshaft gears 26, 27 are arranged opposite one another in the cage element 22 so as to extend coaxially relative to the axis of rotation A and their teeth engage those of the differential gears 25. The second differential drive 4 is also provided in the form of a crown gear differential, which means that the sideshaft gears 26, 27 are formed as crown gears with crown teeth. The two crown gears 26, 27 each comprise a hub 28, 29 with inner teeth 30, 31 which can be inserted in a rotationally fast way into sideshafts (not illustrated in this embodiment). The hubs 28, 29 of the crown gears 26, 27 project axially from the crown teeth and form cylindrical projections which serve as abutment faces 32, 33 for the differential gears 25. On their radial outsides, the differential gears 25 each comprise a spherical outer face 34 by means of which they are radially supported against a corresponding spherical inner face 35 of the cage element 22 in respect of the axis of rotation A. In the present embodiment, exactly two differential gears 25 are provided which are rotatably supported on a common journal 36. The journal 36 comprises helically extending lubricating grooves 66 for lubricating the bearing regions.

When torque is transmitted from the differential carrier 5 to the differential gear set of the first differential drive 3 and to the differential gear set of the second differential drive 4, there occur expanding forces which, with reference to the axis of rotation A, act in axially opposed directions. The expanding forces acting at the first differential drive 3 are introduced via a radial face 59 of the first output gear 7 on the one hand and, on the other hand, via a radial face 60 of the cage element 22, which is firmly connected to the second output gear 8, into the second carrier part 12. The expanding forces acting at the second differential drive 4 are introduced in the one axial direction via a radial face 61 of the first sideshaft gear 26, which abuts a radial supporting face 62 of the inserted element 20, into the differential carrier 5 against which the inserted element 20 is supported by means of a corresponding radial face. The expanding forces of the second differential drive 4, which act in the opposite direction, are introduced into the differential carrier 5 via a radial face 63 of the second sideshaft gear 27 which is supported against a corresponding supporting face 64. Between the radial faces and the supporting faces there are provided wear-reducing abutment discs 65.

With reference to the axis of rotation A, the two differential drives 3, 4 are arranged axially close to one another, with the inter-engaging teeth of the first differential gears 6 and of the second output gear 8 being positioned radially outside the first sideshaft gear 26 and while partially axially overlapping with same with reference to the axis of rotation A. This embodiment is particularly space-saving, so that the differential assembly is light-weight. Furthermore, the inter-engaging teeth of the first differential gears 6 and of the first output gear 7 are positioned approximately on one diameter with the crown teeth of the sideshaft gears 26, 27. Overall, the double differential assembly 2 thus comprises a small radial size with reference to the axis of rotation A, which is advantageous for its use in a motor vehicle driven by a plurality of axles and having a transversely built-in engine. The differential gears 6, 25 of the two differential drives 3, 4, which are provided in the form of spur gears, are identical, so that the number of parts is reduced, which has an advantageous effect on the production costs.

FIG. 2 shows the differential gear set of the first differential drive 3 and the differential gear set of the second differential drive 4. The second output gear of the first differential drive with an integrally connected cage element is not illustrated.

Figure 3:
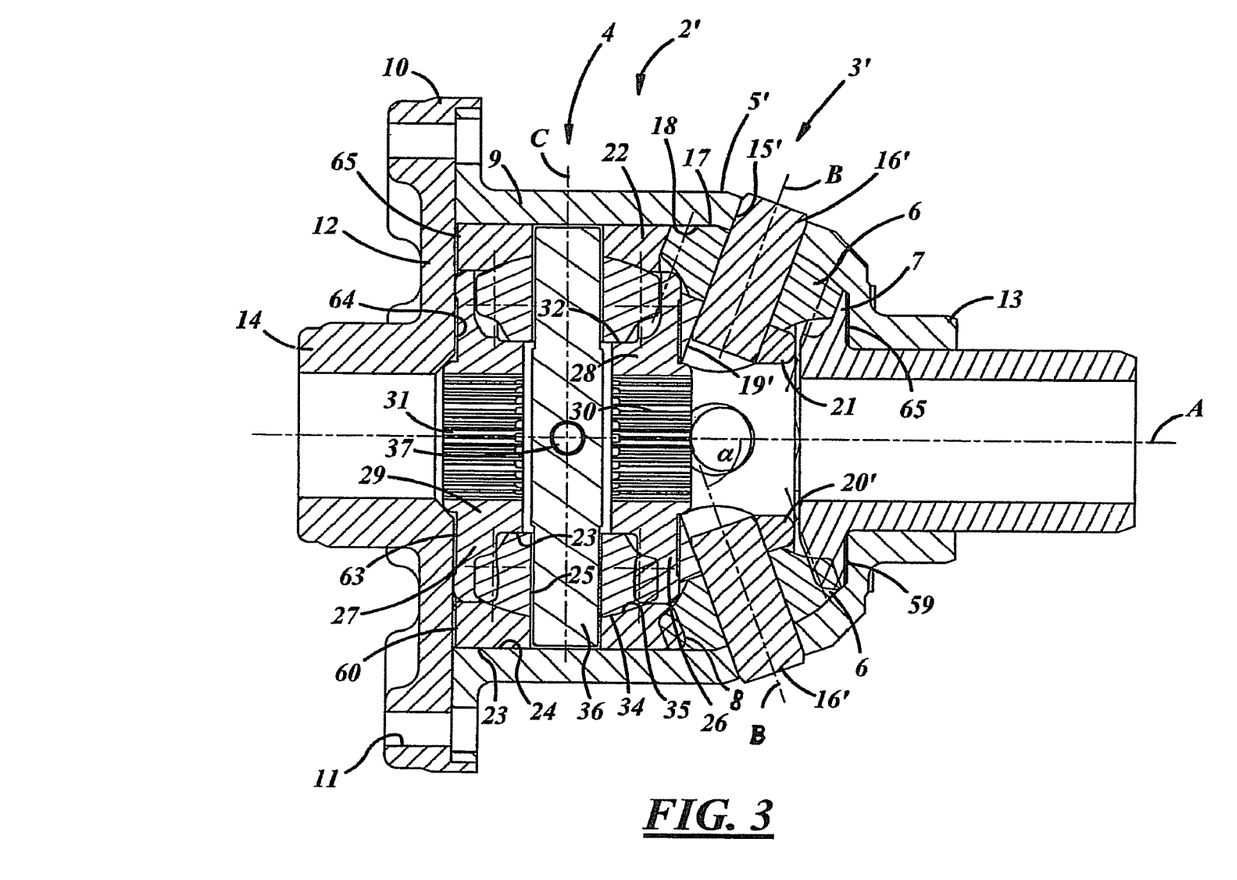
FIG. 3 is a longitudinal section through a second embodiment of an inventive double differential assembly.

FIG. 3 shows a double differential assembly 2' which is similar to, and largely corresponds to, the assembly shown in FIG. 1. To that extent, reference is made to the above description, with identical components having been given identical reference numbers and with modified components having been given reference numbers with an apostrophe. The only difference consists in the number of differential gears of the two differential drives, which in each case amounts to four. The four differential gears 6 of the first differential drive 3' are uniformly distributed around the circumference. Accordingly, the differential carrier 5' is provided with four bores 15' for receiving four journals 16' which are offset by 90° around the axis of rotation A. Furthermore, the inserted element 20' is also provided with four bores 19' into which there are inserted the journals 16' by means of their inner ends. The present double differential assembly 2' with four differential gears 6 is suitable for transmitting higher torques than the above-mentioned embodiment because the torque to be transmitted from the differential carrier 5' to the output gears 7, 8 is transmitted via a total of four sets of inter-engaging teeth. The number of differential gears 25 of the second differential drive 4' is also four. In consequence, there are provided two transversely extending journals 37 which are inserted into a central through-bore of the journal 36 and on which there are supported the additional two differential gears. In the case of the present embodiment, too, the differential gears 6, 25 of the two differential drives 3', 4' are identical so that the number of parts of reduced.

Figure 4:
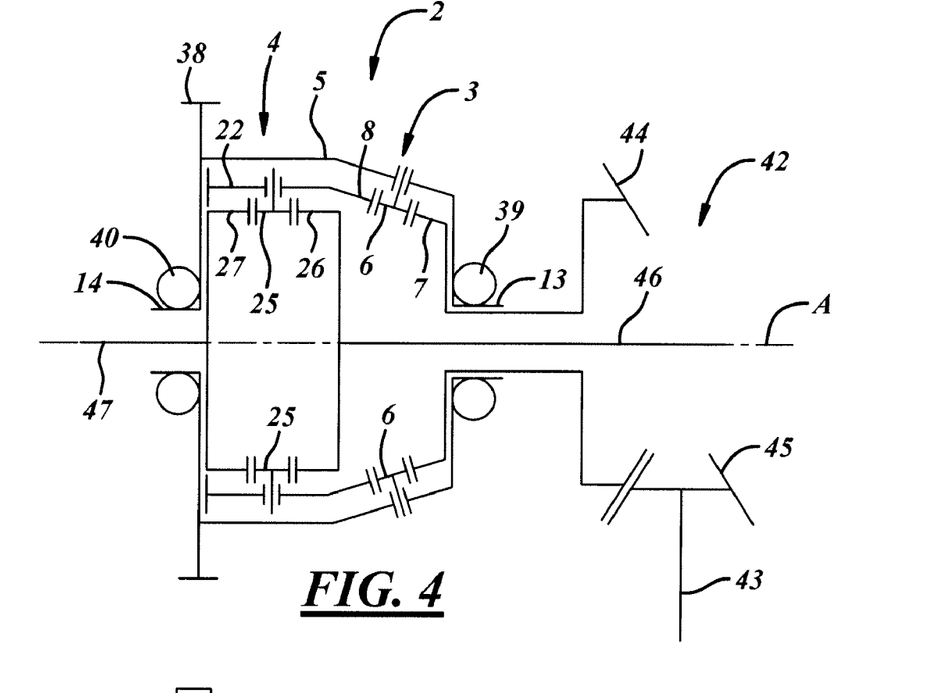
FIG. 4 shows the design principles of a double differential assembly according to FIGS. 1 and 3 respectively.

FIG. 4 shows the double differential assembly according to FIGS. 1 and 3, giving the design principles. Identical components have been given identical reference numbers. In addition to the components illustrated in FIG. 1, the present embodiment comprises an input gear 38 for introducing torque into the differential carrier 5, as well as the bearing means 39, 40 for supporting the differential carrier 5. In this example, the bearing means 39, 40 are provided in the form of rolling contact bearings. Furthermore, there is provided an angle drive 42 for transmitting the torque intended for the rear axle from the first output gear 7 to the propeller shaft 43 of the motor vehicle. The angle drive 42 comprises a ring gear 44 connected to the first output gear 7 in a rotationally fast way, as well as a pinion 45 which engages same and which, in turn, is firmly connected to the propeller shaft 43. Furthermore, there are provided sideshafts 46, 47 of the front axle which are positioned coaxially relative to the axis of rotation A.

Figure 5:
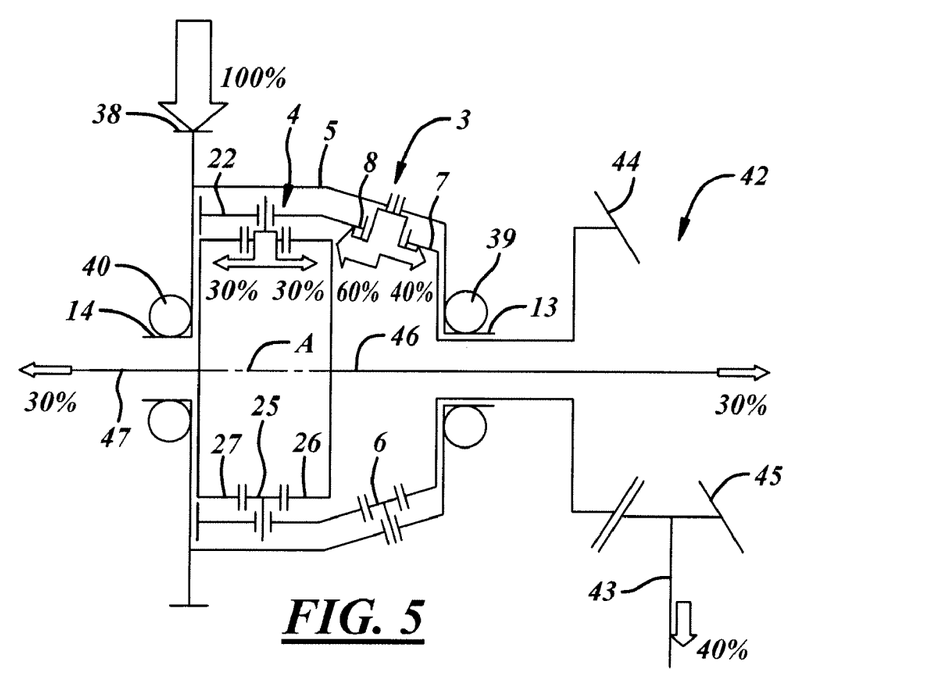
FIG. 5 shows the double differential assembly according to FIG. 4 with drawn-in torque flow.

FIG. 5 shows the distribution of torque from the input gear 38 to the sideshafts 46, 47 of the front axle and to the propeller shaft 43. Because of the different numbers of teeth of the output gears 7, 8, the torque introduced from the engine via the input gear 38 into the differential drive 3 is distributed in unequal parts. This results in an angular position of the differential gears 6 relative to the axis of rotation A. The angles α of the axes B are selected to be such that approximately 40% of the torque introduced into the differential carrier 5 is transmitted to the first output gear 7 via the angle drive 42 on to the rear axle, whereas 60% of the torque is transmitted via the second output gear 8 and the second differential drive 4 to the front axle. The torque transmitted to the second differential 4 is, in turn, is divided in equal parts and distributed to the sideshaft gears 26, 27, so that 30% of the torque introduced into the double differential assembly 2 is allocated to each of the two sideshaft gears 46, 47. Accordingly, the two sideshafts of the rear axle are each driven by 20% of the total available torque.

Figure 6:
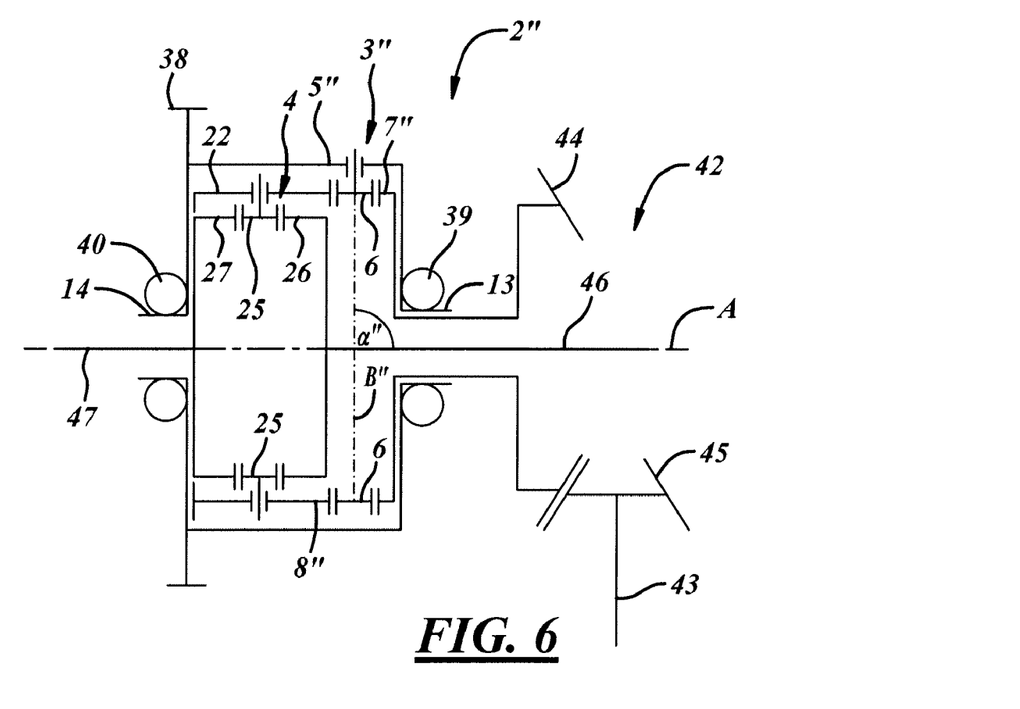
FIG. 6 shows the design principles of an inventive double differential assembly in a third embodiment.

FIG. 6 shows a further embodiment of the inventive double differential assembly, which, in respect of design and functioning, mostly corresponds to the embodiments according to FIGS. 1 to 4. To that extent, reference is made to the above description, with identical components having been given identical reference numbers and with modified components having been given reference numbers with two apostrophes. The present embodiment is characterised in that the differential gears 6 of the first differential drive 3" are held on axes B''' positioned perpendicularly on the axis of rotation A. In this embodiment, the torque is distributed in equal parts to the first and the second output gear 7", 8" and thus to the rear axle and to the front axle. As in the first embodiment, the first differential drive 3" is provided in the form of a crown gear differential, i.e. the differential gears 6 are provided in the form of cylindrical spur gears and the output gears 7", 8" are provided in the form of crown gears. In the present embodiment, the crown teeth of the crown gears are positioned in radial planes with reference to the axis of rotation A. In the present embodiment, too, the first differential gears 6 and the second differential gears 25 are identical, which has advantages in terms of production and cost.

Figure 7:
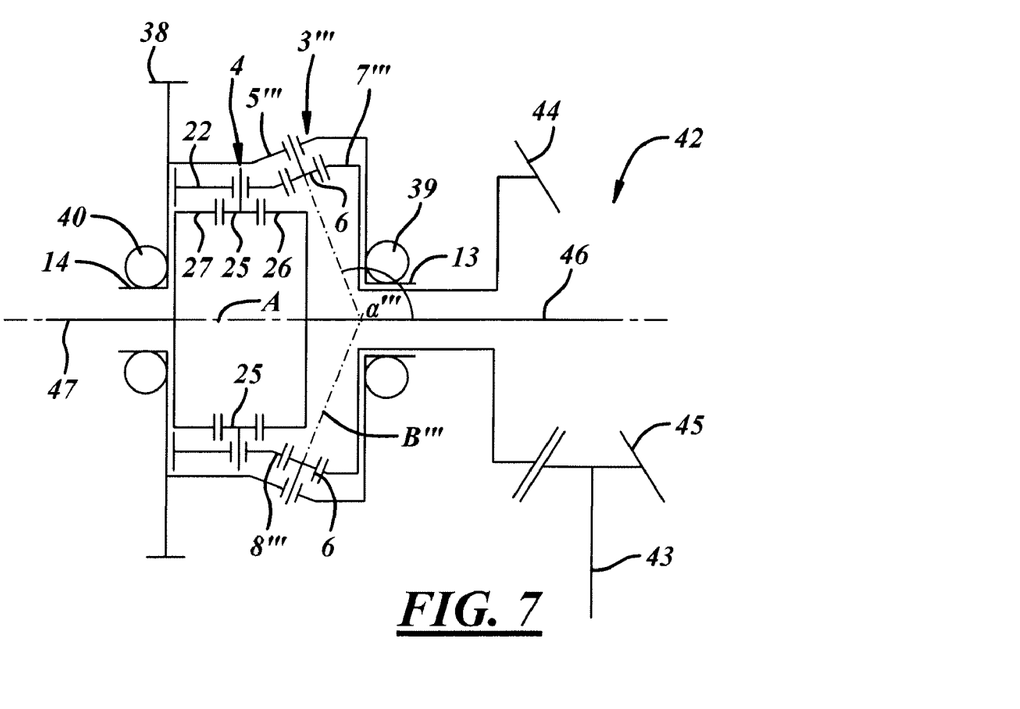
FIG. 7 shows the design principles of an inventive double differential assembly in a fourth embodiment.

FIG. 7 shows a further embodiment of an inventive double differential assembly which, in respect of design and functioning, mostly corresponds to the above embodiments. To that extent, reference is made to the above description, with identical components having been given identical reference numbers and with modified components having been given reference numbers with three apostrophes. The modified feature of the present embodiment is that the angle α which is enclosed between the axes B''' and the axis of rotation A is greater than 90° and is shown as approximately 110°. In the present embodiment, the angle α could range between 90° and about 170°. There is thus transmitted a greater amount of torque to the first output gear 7''' and to the rear axle respectively than to the second output gear 8''' and the front axle respectively. In the present double differential assembly 2''' the number of teeth of the output gears 7''' have been selected to be such that approximately 60% of the torque introduced into the differential carrier is transmitted to the rear axle, whereas approximately 40% is transmitted to the front axle. As in the above embodiment, both differential drives 3''', 4 are provided in the form of crown gear differentials, which means that the first and the second differential gears 6, 25 are provided in the form of cylindrical spur gears. The spur gears 6, 25 of the first and of the second differential drive are identical. In the present embodiment, the crown teeth of the first output gear 7''' have a greater diameter than the crown teeth of the second output gear 8''' which is firmly connected to the cage element 22.

Figure 8:
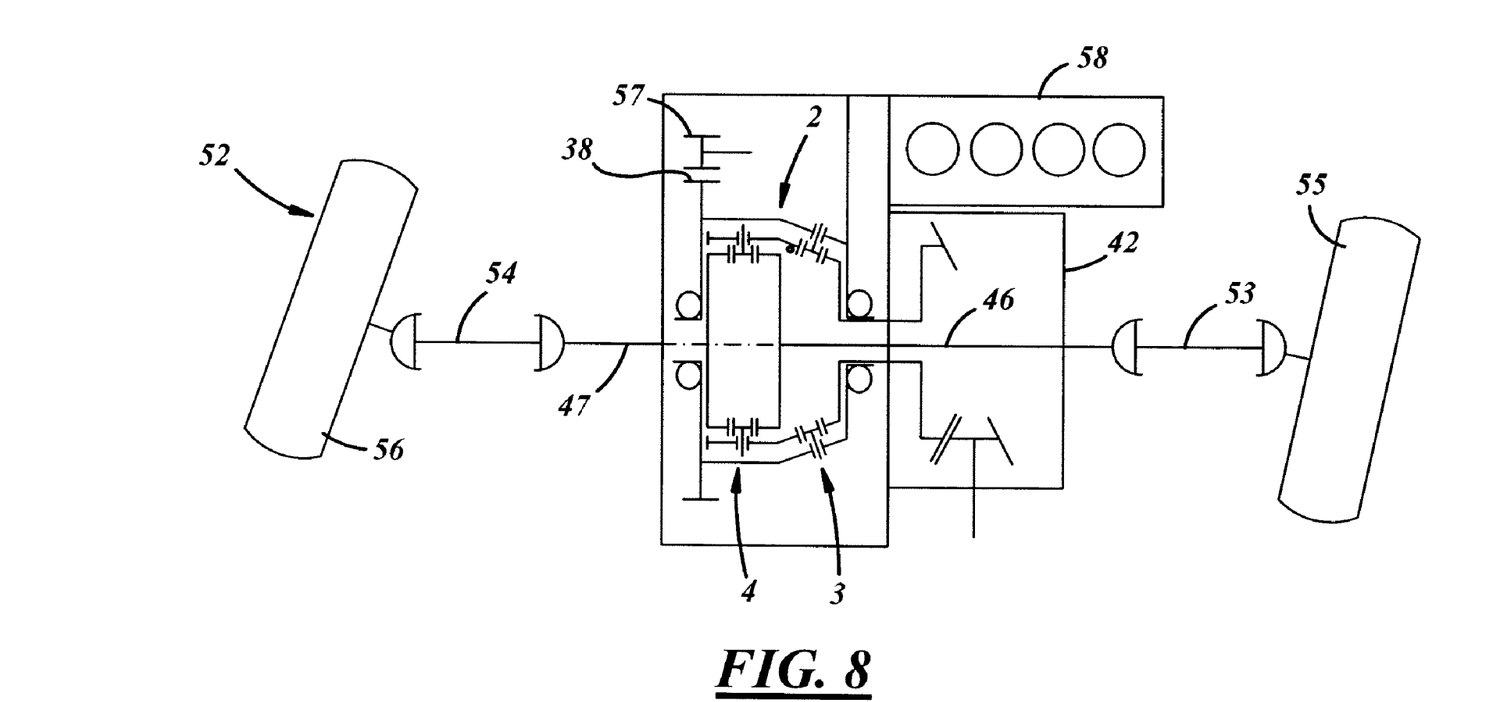
FIG. 8 shows a driving axle of a motor vehicle driven by a plurality of axles, having an inventive double differential assembly according to FIG. 4.

FIG. 8 shows the front axle 52 of a vehicle driven by a plurality of axles (not illustrated). The front axle 52 comprises a double differential assembly 2 according to FIG. 4 with an angle drive 42, two sideshafts 46, 47, two driveshafts 53, 54 attached to the latter and two wheels 55, 56. The double differential assembly 2 is driven via a pinion 57 by an engine/gearbox unit 58. The teeth of the pinion 57 engage those of the input gear 38 which is connected to the differential carrier 5 in a rotationally fast way. As already mentioned above, the double differential assembly 2 comprises a first differential drive 3 for distributing the torque to the front axle and to the rear axle, as well as a second differential drive 4 arranged coaxially thereto, for distributing the torque transmitted to the front axle 52 between the two sideshafts 46, 47. The first differential drive 3 permits a differential effect between the front axle and the rear axle, whereas the second differential drive 4 has a differential effect between the two sideshafts 46, 47 to avoid torsion in the driveline.

The example of FIG. 8 also contemplates that one of the inventive double differential assemblies according to FIG. 6 or 7 can also be used in the illustrated front axle.

While the invention has been described in connection with several embodiments, it should be understood that the invention is not limited to those embodiments. Rather, the inven-

What is claimed is:

1. A double differential assembly for use in the driveline of a motor vehicle driven by a plurality of axles, comprising:
   a first differential drive comprising a differential carrier which is rotatingly drivable around an axis of rotation (A), a plurality of first differential gears which are rotatably held in the differential carrier on first axes (B) extending at an angle relative to the axis of rotation (A) and which rotate jointly with the differential carrier around the axis of rotation (A), and a first output gear and a second output gear which are arranged coaxially relative to the axis of rotation (A) and engage the first differential gears; and
   a second differential drive comprising a cage element which is firmly connected to the second output gear of the first differential drive so as to be rotatingly drivable by same around the axis of rotation (A), a plurality of second differential gears which are rotatably held in the cage element on second axes (C) extending perpendicularly relative to the axis of rotation (A) and which rotate jointly with the cage element around the axis of rotation (A), and a first sideshaft gear and a second sideshaft gear which are arranged coaxially relative to the axis of rotation (A) and engage the second differential gears;
   wherein at least one of the two differential drives is provided in the form of a crown gear differential, wherein the differential gears of said at least one of the two differential drives are cylindrical spur gears, and wherein the angles which are enclosed between the first axes (B) of the first differential gears and the axis of rotation (A) are greater than 10° and smaller than 90°.

2. The double differential assembly according to claim 1, wherein the first differential drive is a crown gear differential, the first and second output gears are crown gears, and the first differential gears are cylindrical spur gears.

3. The double differential assembly according to claim 1, wherein the second differential drive is a crown gear differential, the first and second sideshaft gears are crown gears, and the second differential gears are cylindrical spur gears.

4. The double differential assembly according to claim 2, wherein the differential gears of the first differential drive and the differential gears of the second differential drive are identical.

5. The double differential assembly according to claim 1, wherein the second output gear of the first differential drive, with reference to the axis of rotation (A), is arranged so as to partially axially overlap with the first sideshaft gear of the second differential drive.

6. The double differential assembly according to claim 1, wherein an inserted part with a central aperture is held in the differential carrier coaxially relative to the axis of rotation (A), which inserted part is axially supported against the differential carrier and against the first sideshaft gear.

7. The double differential assembly according to claim 6, wherein the inserted element is held so as to be rotationally fixed with the differential carrier.

8. The double differential assembly according to claim 6, wherein the inserted element comprises bores into which there are inserted journals with inner ends for supporting the first differential gears, wherein outer ends of the journals are received in apertures of the differential carrier.

9. The double differential assembly according to claim 1, wherein the differential carrier comprises an inner cylindrical portion in which the cage element is slidingly supported by a cylindrical outer face.

10. The double differential assembly according to claim 1, wherein the cage element and the second output gear are integrally formed.

11. The double differential assembly according to claim 10, wherein the cage element is annular in shape and axially supported by a first end face against the differential carrier, and wherein the second output gear is formed at a second end face extending in the opposite direction.

12. The double differential assembly according to claim 1, wherein the first and second sideshaft gears of the second differential drive each comprise a hub with an outer cylindrical abutment face on which the second differential gears are radially supported with reference to the axis of rotation (A).

13. The double differential assembly according to claim 1, wherein the cage element comprises radial bores, into which there are inserted journals for supporting the second differential gears.

14. The double differential assembly according to claim 1, wherein the cage element is axially supported relative to the differential carrier by a needle bearing.

15. A double differential assembly for use in the driveline of a motor vehicle driven by a plurality of axles, comprising:
   a first differential drive comprising a differential carrier which is rotatingly drivable around an axis of rotation (A), a plurality of first differential gears which are rotatably held in the differential carrier on first axes (B) extending at an angle relative to the axis of rotation (A) and which rotate jointly with the differential carrier around the axis of rotation (A), and a first output gear and a second output gear which are arranged coaxially relative to the axis of rotation (A) and engage the first differential gears; and
   a second differential drive comprising a cage element which is firmly connected to the second output gear of the first differential drive so as to be rotatingly drivable by same around the axis of rotation (A), a plurality of second differential gears which are rotatably held in the cage element on second axes (C) extending perpendicularly relative to the axis of rotation (A) and which rotate jointly with the cage element around the axis of rotation (A), and a first sideshaft gear and a second sideshaft gear which are arranged coaxially relative to the axis of rotation (A) and engage the second differential gears;
   wherein at least one of the two differential drives is provided in the form of a crown gear differential, wherein the differential gears of said at least one of the two differential drives are cylindrical spur gears, and wherein the angles which are enclosed between the first axes (B) of the first differential gears and the axis of rotation (A) are greater than 90° and smaller than 170°.

16. A double differential assembly for use in the driveline of a motor vehicle driven by a plurality of axles, comprising:
   a first differential drive comprising a differential carrier which is rotatingly drivable around an axis of rotation (A), a plurality of first differential gears which are rotatably held in the differential carrier on first axes (B) extending at an angle relative to the axis of rotation (A) and which rotate jointly with the differential carrier around the axis of rotation (A), and a first output gear and a second output gear which are arranged coaxially relative to the axis of rotation (A) and engage the first differential gears; and a second differential drive comprising a cage element which is firmly connected to the second output gear of the first differential drive so as to be rotatingly drivable by same around the axis of rotation (A), a plurality of second differential gears which are rotatably held in the cage element on second axes (C) extending perpendicularly relative to the axis of rotation (A) and which rotate jointly with the cage element around the axis of rotation (A), and a first sideshaft gear and a second sideshaft gear which are arranged coaxially relative to the axis of rotation (A) and engage the second differential gears;

wherein at least one of the two differential drives is provided in the form of a crown gear differential, wherein an inserted part with a central aperture is held in the differential carrier coaxially relative to the axis of rotation (A), which inserted part is axially supported against the differential carrier and against the first sideshaft gear, the inserted element held so as to be rotationally fixed with the differential carrier.

17. The double differential assembly according to claim 16, wherein the angles which are enclosed between the first axes (B) of the first differential gears and the axis of rotation (A) is 90°.

* * * * *